United States Patent [19]

Mason et al.

[11] E Patent Number: Re. 31,825

[45] Reissued Date of Patent: Feb. 5, 1985

[54] METHOD OF MAKING NONWOVEN FABRIC AND PRODUCT MADE THEREBY HAVING BOTH STICK BONDS AND MOLTEN BONDS

[75] Inventors: Charles R. Mason, Hammonton; David K. Osteen, Williamstown; Lawrence Vaalburg, Vineland, all of N.J.

[73] Assignee: Scott Paper Company, Philadelphia, Pa.

[21] Appl. No.: 567,809

[22] Filed: Jan. 3, 1984

Related U.S. Patent Documents

Reissue of:

[64] Patent No.: 4,315,965
Issued: Feb. 16, 1982
Appl. No.: 161,270
Filed: Jun. 20, 1980

[51] Int. Cl.[3] ..... D04H 1/54; D04H 3/14

[52] U.S. Cl. ..... 428/198; 156/181; 156/290; 156/308.4; 156/309.9; 156/322; 264/119; 264/126; 264/280; 428/288; 428/296; 604/370

[58] Field of Search ..... 156/181, 290, 308.4, 156/309.9, 322; 264/119, 126, 280; 428/198, 288, 296

[56] References Cited

U.S. PATENT DOCUMENTS

| | | |
|---|---|---|
| 3,261,899 | 7/1966 | Coates . |
| 3,442,740 | 5/1969 | David . |
| 3,542,634 | 11/1970 | Such et al. . |
| 3,660,555 | 5/1972 | Rains et al. . |
| 3,772,107 | 11/1973 | Gentile et al. . |
| 3,855,046 | 12/1974 | Hanson et al. . |
| 4,005,169 | 1/1977 | Cumbers . |
| 4,035,219 | 7/1977 | Cumbers . |
| 4,128,679 | 12/1978 | Pohland . |
| 4,151,023 | 4/1979 | Platt . |

*Primary Examiner*—James C. Cannon
*Attorney, Agent, or Firm*—John W. Kane; Joseph H. Yamaoka

[57] ABSTRACT

The method of autogenously bonding a nonwoven web formed predominantly of thermoplastic fibers is characterized by the steps of directing heat into the web from only one surface thereof to preheat the web, and then directing the preheated web through a bonding nip formed between opposed rolls, one of said rolls being hotter than the other roll, being capable of heating the web surface it engages to a temperature above the melt point of the thermoplastic fibers and being positioned to engage the surface of the web opposite the one into which heat was directed during the preheating operation; said webs being preheated by means completely independent of the opposed rolls that form the bonding nip, and most preferably by infrared panels. The nonwoven product formed in accordance with this method also forms a part of the instant invention.

27 Claims, 1 Drawing Figure

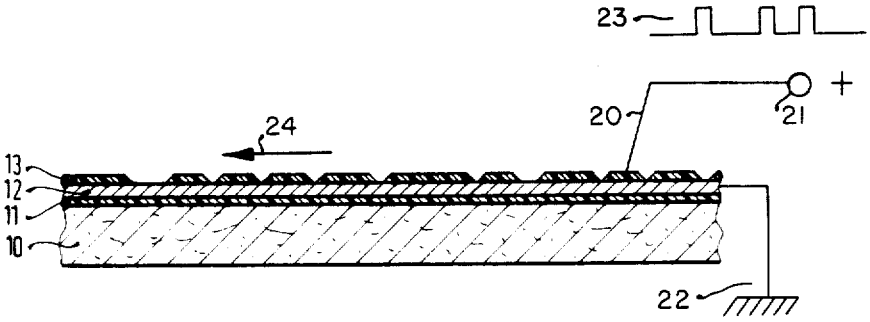
23
+
20
21
24
13
12
11
10
22

METHOD OF MAKING NONWOVEN FABRIC AND PRODUCT MADE THEREBY HAVING BOTH STICK BONDS AND MOLTEN BONDS

Matter enclosed in heavy brackets [ ] appears in the original patent but forms no part of this reissue specification; matter printed in italics indicates the additions made by reissue.

TECHNICAL FIELD

This invention relates generally to the field of nonwoven fabrics, and in particular to a method of thermally bonding a nonwoven fabric and to the autogenously bonded fabric produced thereby.

BACKGROUND ART

Nonwoven fabrics have become quite popular for many different end uses wherein textile-like properties, such as softness, drapeability, strength and abrasion resistance are desired. A very significant market for nonwoven fabrics, and in particular nonwoven webs including predominately textile-length fibers, is for facing sheets in products such as disposable diapers. These sheets are placed in direct contact with the baby's skin, and therefore, at least the surface of the nonwoven fabric contacting the skin should be extremely soft and nonabrasive to prevent chafing.

Of particular interest for use as facing sheets are carded non-woven webs having a low basis weight of no more than about 0.0339 kg/m$^2$(1 oz./yd$^2$). A representative method of forming such a carded nonwoven web is disclosed in U.S. Pat. No. 3,772,107, issued to Gentile et al, and assigned to Scott Paper Company. This type of web is characterized by highly directional properties in view of the fact that the fibers tend to align in the direction of web formation. Although some fibers are rearranged into the cross-machine-direction during web formation, the fibrous web generally is considerably weaker in the cross-machine-direction than in the machine-direction.

Carded nonwoven webs commonly are stabilized by some type of bonding operation, with an effort being made to improve the cross-machine-direction wet tensile energy absorption level (CDWTEA) without creating harsh, abrasive or stiff characteristics that would make the webs unsuitable for use as a diaper facing sheet, or for that matter, for other uses wherein soft, nonabrasive surface characteristics are desired. Efforts to-date have met with moderate success. However, for future generation diapers, higher levels of softness, surface feel and drapeability are desired. These desired tactile properties need to be achieved in webs having the necessary strength and stretch characteristics to permit them to function adequately as a facing sheet. This is an extremely challenging objective since bonding the web to achieve the necessary strength and stretch characteristics (i.e. TEA) generally is accompanied by reduced, or impaired tactile properties.

Tensile energy absorption (TEA) is the area under the stress/strain curve at web failure, and represents the energy absorbed by the product as it is stretched to failure.

The TEA and strength levels reported in this application can be determined on a Thwing Albert Electronic QC Tensile Tester, "Intelect 500", with a 160 ounce load cell, and being set at 99% sensitivity. The test is carried out by clamping a 0.0254 m (1 inch)×0.1778 m (7 inch) rectangular test sample in opposed jaws of the tensile tester with the jaw span being 5 inches. The jaws are then separated at a crosshead speed of 0.127 m (5 inches) minute until the sample fails. The digital integrator of the tensile tester directly computes and displays tensile strength (grams/inch), TEA (inch-grams/inch$^2$) and stretch (%) at failure. Wet TEA, strength and stretch values are obtained by immersing the sample in water prior to testing.

One very desirable technique for stabilizing nonwoven webs is to employ a predominate amount of thermoplastic fibers in the construction, and then to autogenously bond the web structure by the application of heat and pressure to the web. Thus, in these webs the thermoplastic fibers actually constitute the bonding medium, and no additional binder needs to be added.

Many different arrangements have been suggested for autogenously bonding webs formed of thermoplastic fibers, as exemplified by U.S. Pat. Nos. 3,542,634 (Such et al); 3,261,899 (Coates); 3,442,740 (David); 3,660,555 (Rains et al); 3,855,046 (Hansen et al) 4,005,169 (Cumbers); 4,035,219 (Cumbers); 4,128,679 (Pohland); and 4,151,023 (Platt et al).

Both the Coates' U.S. Pat. No. (3,261,899) and the Hansen et al U.S. Pat. No. (3,855,046) suggest preheating the web prior to actually establishing the desired bond structure in a subsequent pressure bonding operation. Although Coates does broadly suggest infrared heating a web prior to passing it through a heated pressure nip (see Ex. V), there is no suggestion of controlling the bond structure through the web to achieve any particular balance of properties.

The Hansen et al U.S. Pat. No. (3,855,046) describes a web formed of thermoplastic continous filaments that is preheated by the same smooth-surfaced roll 30 that cooperates with the heated embossing roll 32 to establish the bonding nip. Thus, control of the preheating temperature independent of the bonding parameters cannot be achieved, since the temperature to which the smooth-surfaced roll 30 is heated must generally be balanced between the requirements for preheating on the one hand, and the requirements for establishing the desired bond structure. Even though other parameters can be varied to regulate the amount of preheating, such as controlling the amount of wrap of the web about the smooth-surfaced roll 30 upstream of the bonding nip, it is believed that the desired independent control of the preheating and bonding operation is extremely difficult to obtain with this type of arrangement. In fact, in forming low basis weight webs of less than about 0.0339 kg/m$^2$ (1 oz./yd$^2$) the bond structure on each side of the web is disclosed as being generally the same; having an unfused bond area coefficient (ubac) of less than about 65%. The high percentage of fused, or melt bonds, established in these latter webs is not believed to provide the necessary tactile characteristics (e.g., softness, drapeability, surface smoothness, etc.) being sought after in products such as new generation diaper facing structures.

DISCLOSURE OF INVENTION

The method of this invention employs a unique controlled gradient bonding technique to establish autogenous (thermal) bonds within a nonwoven web structure formed predominately, and most preferably entirely of thermoplastic fibers. The method of this invention is characterized by the steps of directing the web to a preheating station at which heat is directed into the web from only one surface thereof; directing the preheated web through a bonding nip formed between opposed rolls; one of said rolls being heated to a temperature close to or exceeding the melt point of the thermoplastic fibers and the other roll (hereinafter referred to as "the back-up roll") being maintained at a lower temperature below the melt point of the thermoplastic fibers; the hotter roll being positioned to engage the surface of the web opposite the one into which heat was directed to preheat the web; said web being preheated by means completely independent of the opposed rolls providing the bonding nip.

Most preferably the most highly heated roll is an embossing roll having raised land areas on its surface, and, for low basis weight webs no greater than about 0.0339 kg/m$^2$ (1 oz./yd.$^2$), the back-up roll should be resilient to provide a more uniform distribution of pressure then can be achieved with a non-resilient roll. The preheating step preferably is carried out by employing infrared radiation, which has been found to provide extremely reliable temperature control.

The term "melt bond" or "molten bond", as used throughout this application, refers to a bond established by melting fibers and is characterized by an appearance wherein the identity of individual fibers in the bond zone is substantially obliterated; taking on a film-like appearance.

The term "stick bond" as used throughout this application, refers to a bond established by heating the fibers to a tacky state in which they are capable of sticking to each other, but wherein the physical fiber form or appearance is still retained; albeit generally in a somewhat flattened state.

It is extremely important in this invention that the preheating operation take place from the side of the web opposite that engaged by the most highly heated bonding roll; i.e., a heated embossing roll in the preferred embodiment. This preheating operation is believed to establish a temperature gradient through the web (the preheated surface of the web being the hottest) that aids, or provides for more efficient control of heat transfer through the web during the bonding operation from the surface engaged by the heated embossing roll than would otherwise be the case if the web were not preheated, or if the web were preheated from the same surface engaged by the heated embossing roll. The manner of preheating in accordance with this invention permits the formation, during the subsequent bonding operation, of autogenous bonds on the preheated surface that are well over 90% (preferably 100%) "stick" bonds, without the need for imparting excessive, web-damaging heat energy into the opposite surface of the web through the heated embossing roll.

Prior to this invention it was extremely difficult to control heat transfer into and through the web to tie down fibers on the surface opposite the heated embossing roll without also over-melting the polymeric fibrous material. Over-melting can cause the polymer to melt and separate, thereby forming strength-reducing and stretch-reducing "pin holes" in the web structure. In the present invention the autogenous bonds formed on the surface engaged by the heated embossing roll are mostly (i.e., generally over 80%) melt bonds (without over-melting) that extend only partially through the web thickness to impart the necessary strength and stretch characteristics to the web.

The method of determining the percentage of autogenous stick bonds and autogenous melt bonds in the web will be described later in this application.

The preheating operation in this invention aids in establishing the desired temperature gradient through the web prior to the bonding operation to permit, upon bonding, the establishment of the desired stretch and strength properties, primarily through the formation of melt bond extending partially through the web from the surface engaged by the heated embossing roll, while at the same time preventing "fuzzing" from the preheated surface of the web by establishing autogenous bonds on the preheated surface that are predominantly "stick" bonds.

The non-woven fabrics in accordance with this invention are characterized by being two-sided, i.e., they have different properties on their opposed surfaces. The high percentage of autogenous bonds that are melt bonds extending into the fabric from one surface creates a somewhat harsh surface feel, as compared to the soft, smooth surface feel created by the high percentage of autogenous bonds that are stick bonds on the opposed surface. However, this high percentage of autogenous melt bonds extending partially through the web thickness is needed to establish the desired cross direction wet tensile energy absorption level (CDWTEA) in the fabric. The high percentage of stick bonds on the opposite surface of the web establishes the necessary abrasion resistance to prevent fiber "fuzzing" without adversely affecting the surface tactile properties.

In this invention the two-sided gradient bond construction described above can be achieved, and actually is achieved in low basis weight webs no greater than about 0.0339 kg/m$^2$. These low basis weight webs have been found to be most suitable for use as facing sheets in products such as disposable diapers. When the sheet is used as a diaper facing the surface in which the autogenous stick bonds predominate is placed outwardly to contact the wearer's skin, since it's the one with the best tactile properties (i.e., it is the softest and smoothest). The opposite surface containing the high percentage of autogenous melt bonds is thus kept out of contact with the wearer's skin. Although the benefits of this invention are known to be signficant in low basis weight web construction no greater than about 0.0339 Kg/m$^2$, it is believed that the teachings of this invention may also be used to control the properties of higher basis weight webs.

Many different types of thermoplastic fibers may be utilized in this invention; the polyolefins being particularly useful. Most preferably this invention employs polypropylene fibers having a length in excess of 0.0254 m (1 inch). A suitable fiber usable in this invention is a 0.0508 m (2 inch), 3 denier polypropylene fiber having a melt point of 167° C. (332.6° F.).

Other objects and advantages of this invention will become apparent by referring to the accompanying drawings, taken in conjunction with the description of the best mode for carrying out the invention.

BRIEF DESCRIPTION OF THE DRAWINGS

FIG. 1 is a schematic elevation view of an arrangement for carrying out the preferred method of this invention;

FIG. 1A is a fragmentary elevation view of the embossing roll illustrating the preferred arrangement of the land areas;

FIG. 2 is a scanning electron microscope photograph, at a magnification of 20, showing one side of an autogenously bonded web in accordance with this invention;

FIG. 3 is a scanning electron microscope photograph, at a magnification of 100, showing a bond area on the side of the web depicted in FIG. 2.

FIG. 4 is a scanning electron microscope photograph, at a magnification of 20, showing the side of the web opposite that shown in FIG. 2; and FIG. 5 is a scanning electron microscope photograph, at a magnification of 50, showing a bond area on the side of the web depicted in FIG. 4.

BEST MODE FOR CARRYING OUT THE INVENTION

Referring to FIG. 1, a schematic representation of equipment for carrying out the method of this invention is illustrated. A web-forming system 10, such as a carding system, is employed to initially form a fibrous web 12. When a carding system is used the fibers are aligned predominately in the machine direction of web formation, as indicated by arrow 13. The preferred fibers employed to form the web 12 are 100% polypropylene, 3 denier, 0.0508 m (2 inch) length sold under the trademark Marvess by Phillips Fibers Corporation, a subsidiary of Phillips Petroleum Company. Other thermoplastic fibers can be employed, and it is also believed that the webs of this invention can be formed from a fiber blend wherein some of the fibers are not thermoplastic. However, it is believed that this invention requires that a preponderance, by weight, of the fibers be thermoplastic textile-length fibers greater than 0.0064 meters (¼-inch) in length, and preferably, greater than 0.0254 meters (1-inch) in length.

The web 12, as initially formed, is quite weak, since the fibers are held together only by the entanglement that naturally occurs when the fibers are deposited on a forming surface, and by the cohesive, or frictional forces between contacting fibers. When the web is formed by a carding or similar operation it is particularly weak in the cross-machine-direction in view of the predominate fiber alignment in the machine-direction of web formation.

After the web is formed it is directed through a preheating station which, in the illustrated embodiment, includes a bank of infrared panels 14. These panels are operated to direct infrared radiation into the web 12 from only the surface 18 thereof. The infrared panels preheat the web, and the web then is directed immediately to the pressure nip of a bonding station provided by opposed rolls 20 and 22. Most preferably the roll 20 is a metal embossing roll, and is heated to a temperature greater than the melting point of the polypropylene fibers. The back-up roll 22 preferably is a resilient roll formed with a one-inch thick polyamide (Nylon) cover 23 having a 90 durometer-Shore A. Preferably this back-up roll is heated in a controlled manner by a suitable surface heating means (e.g. infrared panels) to a temperature below the melting point of the thermoplastic fibers, and most preferably below the stick point of such fibers.

It is extremely important in this invention to preheat the web from the side opposite that engaged by the heated metal embossing roll 20. This preheating operation is believed to establish a temperature gradient through the web (the preheated surface 18 being the hottest) that provides for more efficient heat transfer control through the web in the subsequent bonding operation than would otherwise be the case if the web were not preheated at all, or if the web were preheated only from the same surface engaged by the heated embossing roll 20. By preheating the web surface 18 to establish a temperature gradient through the web thickness it is easier to control the rate of heat transfer into and through the web 12 from the surface 25, which is the surface engaged by the most highly heated embossing roll 20. This permits the reliable formation of autogenous bonds on the preheated surface 18 that are well over 90% stick bonds, and most preferably 100% stick bonds, without the need for imparting excessive, web-damaging heat energy into the opposed surface 25 through the heated embossing roll 20.

Prior to this invention it was extremely difficult to control heat transfer into and through the web to form the necessary structure for tying down the fibers on one web surface, without, at the same time, overbonding the polymeric fibrous material from the opposed surface. Overbonding actually caused the polymer to melt and separate from itself, thereby forming strength-reducing and stretch-reducing "pinholes" in the web structure. In the present invention the bonding operation is carried out to form the high percentage of stick bonds on the preheated surface 18 with the autogenous bonds formed on the opposed surface 25 being mostly (i.e., generally over 80%) melt bonds that extend only partially through the web thickness, and this is achieved without overbonding the web. The partially penetrating melt bond construction is the major contributor to the strength and stretch characteristics of the web.

In the most preferred embodiment of this invention applicants rely primarily upon heat transfer through the web from the heated embossing roll 20 to establish the desired stick bond construction on the preheated surface 18. In this regard the preferred method is carried out with the backup roll 22 heated to a temperature below the stick point of the thermoplastic fibers. Heating the backup roll 22 has been found to be highly advantageous in enhancing the control of heat transfer into and through the web, to thereby permit better control over the ultimate bond structure than would otherwise be the case if the backup roll 22 were not heated.

It is particularly desirable to employ a back-up roll 22 that is resilient when forming webs 12 in the low basis weight range of no more than about 0.0339 $Kg/m^2$ (1 $oz./yd.^2$). This is important since the resilience of the roll tends to provide a more uniform pressure distribution then would otherwise be the case if the back-up roll 22 were non-resilient. The control over pressure distribution is quite important, since, in conjunction with the temperature of the bonding rolls 20, 22 and the speed of travel of the web 12 through the bonding nip, the pressure is an important variable in controlling the bond structure of the web.

FIG. 1A shows a preferred pattern of land areas 24 extending transversely across the embossing roll 20 to form transverse molten bonds for enhancing the cross-machine-direction strength of the bonded web. These land areas preferably occupy less than 50% of the embossing roll area, and most preferably occupy approximately 20–25% of this area to thereby establish an autogenous bond area through web surface 25 that occupies less than 50% of the web's surface area, and most preferably approximately 20–25% of the web's surface area. Although these land areas are shown as continuous, some discontinuities can exist while still achieving the necessary molten bond structure for achieving the most desired cross-machine-direction strength and energy absorption levels for diaper facing sheets, as will be set forth later in this application. Reference throughout this application to molten bonds being "substantially continuous" is intended to cover molten bonds which are either completely continuous, or which have limited discontinuities in them. After the web has been directed through the bonding nip established between the rolls 20 and 22 it can then be rolled up into a parent roll (not shown) for subsequent storage and/or reuse.

In accordance with the best mode for carrying out this invention the temperature of the infrared panels 14, as well as the temperature of the heated embossing roll 20 and the back-up roll 22 are coordinated with the fiber characteristics, the basis weight of the web 12, the line speed and the bonding pressure to form a Z-direction bond gradient wherein the autogenous bonds on the web surface engaged by roll 20 are predominately (preferably over 80%) melt bonds that extend partially through the web thickness to provide the desired strength and stretch in the web, and wherein the autogenous bonds on the opposite surface engaged by the resilient back-up roll 22 are well over 90% stick bonds to tie down surface fibers without adversely affecting tactile properties. In fact, in accordance with this invention the autogenous bonds on the web surface 18 engaged by the resilient back-up roll 22 can be controlled to be substantially devoid of melt bonds (they will be almost entirely stick bonds) while at the same time achieving an improved depth of penetration of melt bonds from the opposite surface 25 to achieve a desired cross-machine-direction wet tensile energy absorption level of approximately 3.15 m-kg/m$^2$ (80 in-grams/in.$^2$) and higher for webs used as a diaper facing or for similar applications. Most preferably these webs also have a cross-machine-direction wet tensile strength of at least 9.83 kg/m (250 gms./in).

Referring to FIGS. 4 and 5, a partial plan view of the resilient roll side 18 of the nonwoven fabric 12 in accordance with this invention is depicted. The bond areas in the surface are indicated at 32, and the characteristics of these bond areas are most clearly seen in FIG. 5. Note that the regions between the bond area 32, as viewed in FIG. 4, show little, if any signs of heat exposure, and the fibers in these regions tend to maintain their original, nonflattened configuration. These regions are believed to enhance the tactile properties of the surface 18.

Turning to FIG. 5, the autogenous bond areas 32 are characterized by an extremely high degree of stick bonds. That is, the individual fibers in the bond region, although somewhat flattened, maintain their individual fiber integrity and form, and can be traced throughout the web structure. Note that there are only a very few regions in the bond area 32 (considerably less than 10% of the bond area) wherein the fiber integrity is in anyway obliterated. This high degree of stick bonds is believed to impart extremely desirable tactile properties (e.g., softness and smoothness) to the surface 18 of the web.

Turning now to FIGS. 2 and 3, the embossing roll side 25 of the web 12 is depicted. Referring specifically to FIG. 2, the web is characterized by a series of autogenous bonded areas 42 with substantial unbonded regions between them. The bonded areas 42 have the general configuration of the land areas 24 on the embossing roll 22 (i.e., they are in the form of undulating lines), and include a high percentage of melted, or fused, bonds having a film-like appearance, as is best seen in FIG. 3. The fibers actually are melted in these completely fused areas to form molten bonds that partially penetrate through the thickness of the web 12. In this invention an improved control over the depth of melt bonding is obtained without adversely effecting the tactile properties on the surface of the web engaged by the resilient roll. The improved control permits consistent formation of webs having desired tactile properties with a cross-machine-direction wet tensile strength of at least 9.83 kg/m (250 gms./in.), and a cross-machine-direction wet tensile energy absorption level of at least 3.15 m-kg/m$^2$ (80 in-grs/in.$^2$), at speeds in excess of 30.48 m/minute (100 ft./minute). In fact, webs having the above balance of tactile and strength properties have been formed at speeds in excess of 91.44 m/minute (300 ft./minute) employing the unique method of this invention. Prior to this invention applicants were not able to obtain the above strength and TEA values, along with acceptable tactile properties, at a web speed as slow as 25.91 m/minute (85 feet/minute).

The method for determining the percentage of autogenous bonds that are stick bonds, and the percentage of autogenous bonds that are melt bonds will now be described. The percentage of stick bonds is defined herein as "the unfused bond area coefficient" (UBAC), and the percentage of melt bonds is calculated as (100-UBAC).

In this invention the percentage of autogenous bonds that are stick bonds (UBAC) on the surface 18 is substantially greater than 90%, and preferably 100%. On the opposed web surface 25 the UBAC should be less than 20% (the percentage of autogenous bonds that are melt bonds should exceed 80%).

The UBAC is determined in the following manner:

Ten 1-inch square samples are taken at random from different bonded parts of the web. A square grid, 2.5 inches on a side, is divided into ten equal segments and is then placed over a scanning electron microscope photograph of the bond area of each sample, at 100× magnification. It is possible that the size of the square grid will need to be modified slightly depending upon the overall dimension of a bonded area in each of the photographs. However, the grid size should be chosen so that it covers as much of the bonded area in each photograph as is possible. It is believed that the specific values of UBAC described and claimed herein is accurate within the range of grid size variations that might be necessary due to variations in the particular dimensions of the bond area that are acceptable in the webs of this invention.

The bond area in each sample is allocated to one of the following three categories (1) 0–33% fusion; (2) 33–66% fusion or (3) 66–100% fusion. The percent fusion of a given bond area is determined by first characterizing each region of the bond area underline each segment of the grids as "fused" or "unfused". A region is characterized as being "unfused" if the presence of individual filaments can be identified anywhere in the region. Likewise a region of the bond area is characterized as being "fused" if the presence of individual fibers cannot be identified anywhere in that region. The percent fusion of each of the bond areas under investigation is the number of regions of the bond area characterized as "fused" (each region underlying a grid segment with no individual fibers being identifiable) divided by 10 (the total number of grid segments). The UBAC is that percentage of the total number of bond areas that are characterized as 0–33% fused.

The above described test is very similar to that described in column 14 of U.S. Pat. No. 3,855,046, discussed earlier in this application.

The following table indicates one set of parameters for carrying out the method of this invention, and the product properties obtained. However, this example is by way of illustration only; the scope of the invention being defined by the claims appended hereto.

| Fiber | Line Speed | Emb. Roll Temp. | Back-up Roll Temp. | IR Temp. of Bank of 6 Panels: Up-Stream Three Panels | IR Temp. of Bank of 6 Panels: Down-Stream Three Panels |
|---|---|---|---|---|---|
| Marvess olefin staple fiber-type CO1. (polypropylene) 2 inch, 3 denier | (m/sec) .66 | (°C.) 191.7 | (°C.) 101.7 | (°C.) 685 | (°C.) 343.3 |

| | Weight | CDWT | CD Stretch | CDW-TEA | MDWT |
|---|---|---|---|---|---|
| | (Kg/m²) .030 | (Kg/m) 15.9 | (%) 49.7 | m-kg/m² 5.37 | (Kg/m) 85.2 |

What is claimed is:

1. A method of autogenously bonding a nonwoven web formed predominantly of thermoplastic fibers, characterized by the steps of directing heat into the web from only one surface thereof to preheat the web, and then directing the preheated web through a bonding nip formed between opposed rolls, one of said rolls being hotter than the other roll, being capable of heating the web surface it engages to a temperature above the melt point of the thermoplastic fibers and being positioned to engage the surface of the web opposite the one into which heat was directed during the preheating operation; said web being preheated by means completely independent of the opposed rolls that form the bonding nip.

2. The method of claim 1 characterized by forming the bonding nip between an embossing roll having raised land areas on its surface and a back-up roll having a resilient surface, said embossing roll being the hotter roll.

3. The method of claim 2 characterized by the step of employing infrared radiation upstream of the bonding nip to preheat the web.

4. The method of claims 1, 2 or 3, characterized by heating the surface of the web with the hotter roll to form autogenous bonds that are predominately melt bonds penetrating only partially through the web thickness, and forming autogenous bonds on the preheated surface that are over 90% stick bonds.

5. The method of claim 4 characterized by forming autogenous bonds on the preheated surface of the web that are substantially 100% stick bonds.

6. The method of claim 4 characterized by forming the bonded web at a speed in excess of 30.48 m/minute (100 ft/minute).

7. The method of claim 4 characterized by forming the bonded web at a speed in excess of 91.44 m/minute (300 ft/minute).

8. A method of autogenously bonding a nonwoven web formed predominantly of thermoplastic fibers and having a basis weight no greater than about 0.0339 kg/m² (1 oz./yd.²), characterized by the steps of directing heat into the web from only one surface thereof to preheat the web, and then directing the preheated web through a bonding nip formed in part by a heated roll that is capable of heating the web surface it engages to a temperature above the melt point of the thermoplastic fiber and being positioned to engage the surface of the web opposite the one into which heat was directed during the preheating operation for creating autogenous bonds that, on the engaged surface, are substantially melt bonds penetrating only partially through the web thickness.

9. The method of claim 8 characterized by the step of establishing the bonding nip between said heated roll and an opposed back-up roll having a lower surface temperature than said heated roll, and controlling the temperature of the opposed rolls, as well as the time and pressure in the bonding nip to form over 90% stick bonds on the preheated surface of the web.

10. The method of claim 9 characterized by forming substantially 100% stick bonds.

11. The method of claim 8 characterized by forming the bonded web at a speed in excess of 30.48 m/minute (100 ft/minute).

12. The method of claim 8 characterized by forming the bonded web at a speed in excess of 91.44 m/minute (300 ft/minute).

13. The method according to claim 8, 9, 10, 11 or 12 characterized by providing the surface engaged by the hotter roll with autogenous bonds that are virtually all melt bonds extending only partially through the web thickness.

14. A nonwoven web made according to the method of claim 1.

15. A nonwoven web made according to the method of claim 1, and having a cross-machine-direction wet tensile energy absorption level of at least about 3.15 m-kg/m² (80 inch-gram/in²).

16. A nonwoven web made according to the method of claim 1 and having a cross-machine-direction wet tensile energy absorption level of at least about 3.15 m-kg/m² (80 inch-grams/in.²) and a cross-machine-direction wet tensile strength exceeding 9.83 kg/m (250 gms./in.).

17. A nonwoven web made according to the method of claim 9.

18. A nonwoven web made according to the method of claim 9, and having a cross-machine-direction wet tensile energy absorption level of at least about 3.15 m-kg/m² (80 inch-gram/in²).

19. A nonwoven web made according to the method of claim 9, and having a cross-machine-direction wet tensile energy absorption level of at least about 3.15 m-kg/m² (80 inch-grams/in.²) and a cross-machine-direction wet tensile strength exceeding 9.83 kg/m (250 gms./in.).

20. A method of making an autogenously bonded web comprising the steps of:

(a) forming a nonwoven web consisting predominantly of thermoplastic fibers;

(b) preheating the formed web from one surface thereof;

(c) directing the preheated web to an embossing station comprising a heated embossing roll and a backup roll having a resilient surface;

(d) passing the web through the nip formed by the heated embossing roll and the backup roll, the heated embossing roll contacting the other surface of the preheated web; and (e) controlling the temperature of the preheating step, the temperature of the heated embossing roll and the bonding pressure so that predominately stick bonds are formed in said one surface of the web and predominately melt bonds are formed in said other surface of the web.

21. The method of claim 20 additionally comprising the step of controlling the temperature of the backup roll.

22. An autogenously bonded web made according to the method of claim 20.

23. The autogenously bonded web of claim 22 characterized in that the autogenous bonds in said one surface are over 90% stick bonds.

24. The autogenously bonded web of claims 22 or 23 characterized in that the autogenous bonds in said other surface are over 80% molten bonds.

25. A method of making an autogenously bonded web comprising the steps of:

(a) forming a nonwoven web consisting predominately of thermoplastic fibers;

(b) preheating the formed unrestrained web from one surface thereof, while the web is unrestrained;

(c) directing the preheated web to an embossing station comprising a heated embossing roll and a backup roll having a resilient surface;

(d) passing the web through the nip formed by the heated embossing roll and the backup roll, the heated embossing roll contacting the other surface of the preheated web; and (e) controlling the temperature of the preheating step, the temperature of the heated embossing roll and the bonding pressure so that predominately stick bonds are formed in said one surface of the web and predominately melt bonds are formed in said other surface of the web.

[26. An autogenously bonded nonwoven web, said web, prior to bonding being weaker in the cross-machine-direction than in the machine-direction, characterized in that the autogenous bonds on one surface include substantially continuous molten bonds extending in a direction, in the plane of the web, for reinforcing the web in the cross-machine-direction, said molten bonds extending only partially through the thickness of the web, said bonded web having a cross-machine-direction wet tensile energy absorption level of at least about 3.15 m-kg/m$^2$ (80 inch-grams/in$^2$) and a cross-machine-direction wet tensile strength exceeding 9.83 kg/m (250 gms/in.).]

[27. the autogenously bonded nonwoven web of claim 26 characterized by a basis weight no greater than about 0.0339 kg/m$^2$.]

[28. The autogenously bonded nonwoven web of claim 26 or 27, characterized in that the opposed web surface has autogenous bonds that are over 90% stick bonds.]

[29. The autogenously bonded nonwoven web of claim 28, characterized in that the opposed web surface has autogenous bonds that are substantially 100% stick bonds.]

[30. The autogenously bonded nonwoven web of claim 28, characterized in that the autogenous bonds on said one surface are over 80% molten bonds.]

*31. A method of autogenously bonding a nonwoven web formed predominately of thermoplastic fibers, characterized by the steps of preheating the web to establish a temperature gradient through the web thickness so that one surface is cooler than the other and then directing the preheated web through a bonding nip formed between opposed rolls, one of said rolls being hotter than the other, being capable of heating the web surface it engages to a temperature above the melt point of the thermopolastic fibers and being positioned to engage the cooler surface of the preheated web; said web being preheated by means completely independent of the opposed rolls that form the bonding nip.*

*32. The method of claim 31 characterized by forming the bonding nip between an embossing roll having raised land areas on its surface and a back-up roll having a resilient surface, said embossing roll being the hotter roll.*

* * * * *